US007532351B2

(12) United States Patent
Horii et al.

(10) Patent No.: US 7,532,351 B2
(45) Date of Patent: May 12, 2009

(54) APPARATUS, METHOD AND PROGRAM FOR PRODUCING SMALL PRINTS

(75) Inventors: Nobuyuki Horii, Tokyo (JP); Takuya Suetani, Tokyo (JP); Shinji Ishizuka, Tokyo (JP); Hiroshi Ono, Tokyo (JP); Seiji Tanaka, Suwa (JP)

(73) Assignees: King Jim Co., Ltd. (JP); Seiko Epson Corporation (JP)

( * ) Notice: Subject to any disclaimer, the term of this patent is extended or adjusted under 35 U.S.C. 154(b) by 920 days.

(21) Appl. No.: 10/973,079

(22) Filed: Oct. 26, 2004

(65) Prior Publication Data

US 2005/0134882 A1 Jun. 23, 2005

(30) Foreign Application Priority Data

Nov. 7, 2003 (JP) ............................ 2003-377680

(51) Int. Cl.
*G06K 15/00* (2006.01)
*G06F 3/12* (2006.01)

(52) U.S. Cl. ........................ 358/1.16; 358/1.1; 358/2.1; 358/1.11; 358/462

(58) Field of Classification Search .................. 358/1.1, 358/1.16, 2.1, 1.11, 462
See application file for complete search history.

(56) References Cited

U.S. PATENT DOCUMENTS

2004/0036915 A1* 2/2004 Vleurinck et al. .......... 358/1.18

FOREIGN PATENT DOCUMENTS

| | | |
|---|---|---|
| JP | 06-198979 | 7/1994 |
| JP | 07-315351 | 12/1995 |
| JP | 2003-308188 | 10/2003 |

* cited by examiner

*Primary Examiner*—Edward L. Coles
*Assistant Examiner*—Thomas J Lett
(74) *Attorney, Agent, or Firm*—Bacon & Thomas, PLLC

(57) ABSTRACT

The invention provides an apparatus, method, and program for producing small prints, in which function of using an input character string for transfer at different timing is further strengthened to improve usability of the user. In the invention, already produced input data includes information on the input character string already transferred to a print medium. Pieces of already produced input data are stored so that the number of pieces of already produced input data is not more than the upper limit number. In a series of processes starting from a direction for producing the print medium, the storage of the already produced input data is performed in the case of the first transfer for the input character string which is currently transferred. Call of the already produced input data is performed according to the user's selection from the pieces of stored already produced input data, and the character string concerning the called already produced input data is returned to the input character string to which input edit can be performed.

7 Claims, 4 Drawing Sheets

APPARATUS, METHOD AND PROGRAM FOR PRODUCING SMALL PRINTS

CROSS-REFERENCE TO RELATED APPLICATION

This application claims, under 35 USC 119, priority of Japanese Application No. 2003-377680 filed Nov. 7, 2003.

BACKGROUND OF THE INVENTION

1. Field of the Invention

The present invention relates to an apparatus, a method, and a program for producing small prints. For example, the invention can be applied to a dedicated tape printing apparatus, a tape printing system in which a personal computer and a label printer are integrated, a dedicated stamp (seal) producing apparatus, and a stamp producing system in which the personal computer, a peripheral for producing the stamp are integrated, and the like.

2. Description of the Related Art

While the dedicated tape printing apparatus prints a string of input characters (it is assumed that the character string is a concept including a symbol, a pictograph, an outer frame, and a background pattern) in a continuous tape if necessary, the dedicated tape printing apparatus discharges and cuts the printed tape. The post-cutting tape in which the character string is printed is referred to as label.

A file registration function is also provided in the tape printing apparatus (Japanese Patent Application Laid-Open No. 6-198979). That is, the tape printing apparatus has the function in which the input character string used for producing the label plurality of times at a time interval is registered in a file and the file is read to perform the printing in each time when the label production is required. For the input character string of an address or a name (form input is adopted), some tape printing apparatuses also have the registration function similar to the file function.

However, in the conventional apparatus, unless the input character string is registered as the file, the address, or the name, the input character string can not be utilized for label production at a later date. Many beginners do not completely use such a registration function.

When the registration is performed to the upper limit number in the file registration function, the registration can not be performed further. Furthermore, when the new registration is performed, it is necessary to perform the new registration after the registration which has been already performed is erased. Therefore, usability is insufficient.

In the input character string having a possibility that the printing is performed the plurality of times at a time interval in a couple of days, unless the input character string is registered in the file at the initial input, it is necessary to input the character string in each case, so that the usability is insufficient. Generally it is rare to perform the file registration in the above-mentioned unstable printing timing of the input character string. If the file registration is performed, when the file is not used later, the file becomes unnecessary or erase of the file takes a lot of trouble.

Further, although the user did not register the file in inputting the character string because the user thought that the label production was only one time, sometimes the user needs the label of the character string at a later time again. In this case, since it is necessary to input the character string again, the usability is insufficient.

SUMMARY OF THE INVENTION

In view of the foregoing, it is an object of the invention to provide the apparatus, method, and program for producing small prints, in which the function of using the input character string for the printing at different timing is further strengthened to improve usability of the user.

A small print producing apparatus of the invention for producing a print medium in which several lines of an input character string are printed, the apparatus comprises (1) already produced input data storage means for storing input data including information on the input character string which has been already printed on the print medium only by pieces not more than the upper limit number, (2) already produced input data storage controlling means for storing additionally the input data as the latest printed input data in the already produced input data storage means when the input data to which the printing is currently performed is not the input data stored in the already produced input data storage means after the printing is performed to the print medium, and erasing the oldest stored already produced input data when the number of pieces of already produced input data stored in the already produced input data storage means by the additional storage exceeds the upper limit number, and (3) already produced input data call controlling means for calling the already produced input data according to user's selection from pieces of the already produced input data stored in the already produced input data storage means to return the character string concerning the already produced input data as the input character string in which input edit can be performed.

In a small print producing method for producing a print medium in which several lines of an input character string are printed, (1) an apparatus to which the method is applied has an already produced input data storage unit for storing already produced input data including information on the input character string which has been already printed on the print medium only by pieces not more than the upper limit number, and the method comprises: (2) an already produced input data storage step of storing additionally the input data as the latest printed input data in the already produced input data storage unit when the input data to which the printing is currently performed is not the input data stored in the already produced input data storage means after the printing is performed to the print medium, and erasing the oldest stored already produced input data when the number of pieces of already produced input data stored in the already produced input data storage unit by the additional storage exceeds the upper limit number; and (3) an already produced input data call controlling step of calling the already produced input data according to user's selection from pieces of the already produced input data stored in the already produced input data storage unit to return the character string concerning the already produced input data as the input character string in which input edit can be performed.

In a small print producing program of the invention for producing a print medium in which several lines of an input character string are printed, a computer on which the small print producing program is mounted has an already produced input data storage unit for storing input data including information on the input character string which has been already printed on the print medium only by pieces not more than the upper limit number, and the small print producing program describes each step of a small print producing method of the invention in code which can be executed by the computer.

BRIEF DESCRIPTION OF THE DRAWINGS

FIG. 3 is a flow chart showing a feature operation when power of the tape printing apparatus of the embodiment is turned on;

FIG. 4 shows an initial selection image when power of the tape printing apparatus of the embodiment is turned on;

DETAILED DESCRIPTION OF THE PREFERRED EMBODIMENTS (A) Embodiment

Referring to the accompanying drawings, a preferred embodiment in which an apparatus, a method, and a program for producing small prints of the invention are applied to the tape printing apparatus, method and program will be described in detail. In this embodiment, the tape printing apparatus is constructed as a dedicated label producing apparatus.

Referring to a functional block diagram of FIG. 1, an electrical overall configuration of the tape printing apparatus of the embodiment will be described first.

Figure 1:
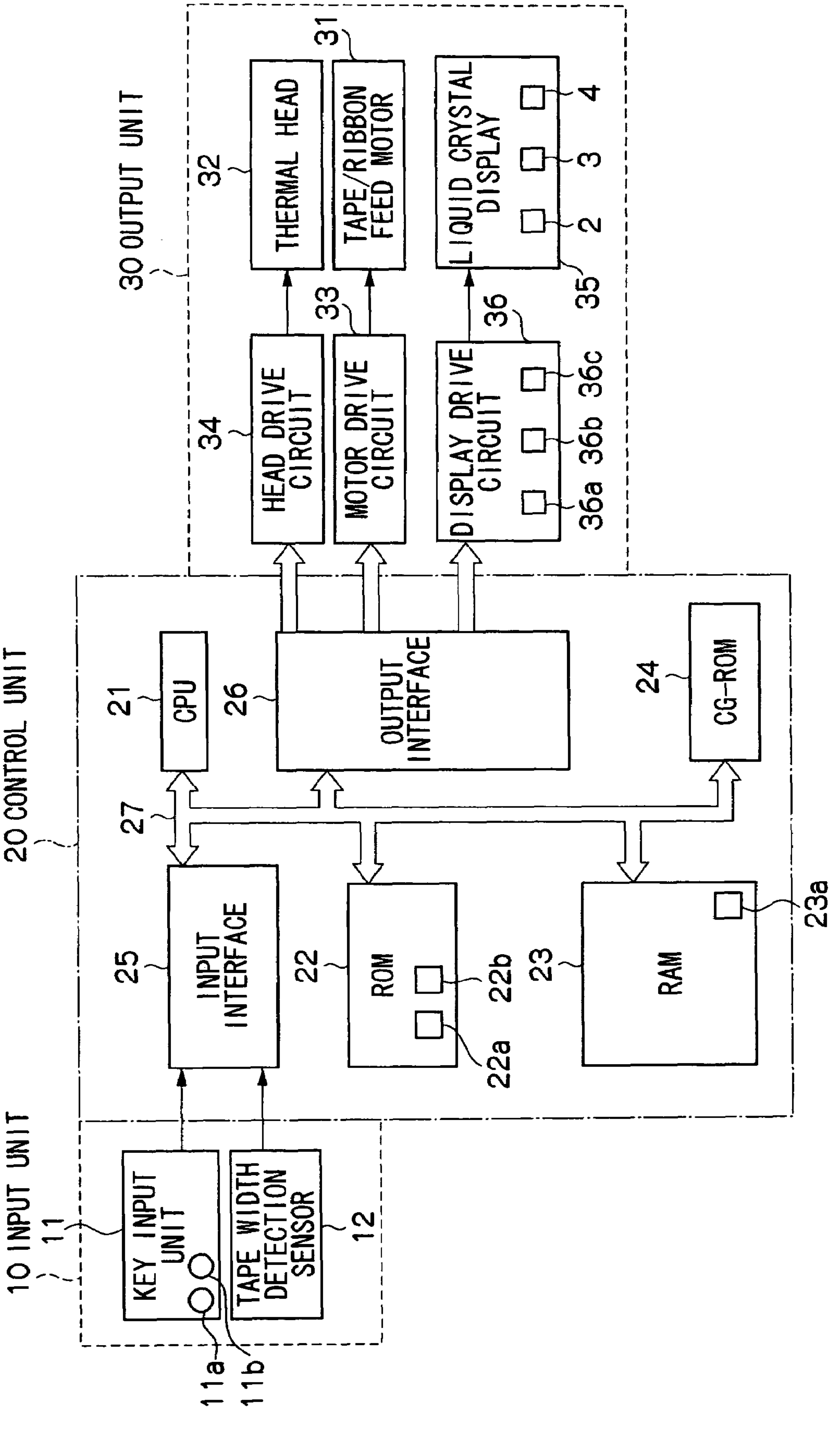
FIG. 1 is a block diagram showing an electric configuration of a tape printing apparatus of an embodiment.

In FIG. 1, similarly to other information processing apparatuses, the tape printing apparatus of the embodiment mainly includes an input unit 10, a control unit 20, and an output unit 30. The control unit 20 is adapted to perform the process according to information from the input unit 10 or a processing stage at that time to cause the output unit 30 to print or display the process result.

Although the detail configuration of the input unit 10 will not be shown, the input unit 10 includes a key input unit 11 having a push down key (or a dial key) and a tape width detection sensor 12. The key input unit 11 generates the character code or various pieces of control data which are provided to the control unit 20. A power key 11*a* and a printing key 11*b* are provided in the key input unit 11. It is also possible that the power key 11*a* and the printing key 11*b* are a dedicated key or the key which also acts as a function key or the like. The tape width detection sensor 12 detects the width of the loaded tape to provide tape width information to the control unit 20. Actually the tape is stored in a tape cartridge, a physical identification element such as a hole defining the tape width is provided in the tape cartridge, and the tape width detection sensor 12 reads the physical identification element to output the tape width information.

The output unit 30 includes a printing configuration and a display configuration. A tape/ribbon feed motor 31 including a stepping motor or a DC motor feeds the loaded tape or ink ribbon (not shown) to a predetermined printing position or the outside of the apparatus. A print head (thermal head used in the embodiment) 32 is fixed to perform the printing to the running tape by thermal transfer. The tape/ribbon feed motor 31 and the print head 32 are driven by a motor drive circuit 33 and a head drive circuit 34 under the control of the control unit 20 respectively. The printed tape is cut by external force from a user or a cutter (not shown) driven by a motor.

A liquid crystal display 35 is provided as a display unit of the tape printing system. The liquid crystal display 35 can display the characters having a predetermined size in several lines (for example, five lines) of several characters (for example, 15 characters). The liquid crystal display 35 is driven by a display drive circuit 36 under the control of the control circuit 20.

A display surface of the liquid crystal display 35 includes a character display area 2, a line number indicator 3, and attribute indicators 4 which represents various attributes concerning an input character string. The character display area 2 is one which indicates the input characters, a guidance message, or the like. The line number indicator 3 has the maximum line number which can be input, and the line number indicator 3 indicates whether the input character exists in the line, whether a cursor is located in the line, or the like. In each of the attribute indicator 4, the attribute shown by the characters corresponding to the attribute indicators 4 and described in the periphery of the display surface is adopted, when the attribute indicator 4 is turned on. The attributes indicated by the attribute indicators 4 include the size of the character, input method such as Japanese phonetic characters input or Roman character input, a unit of a certain amount of characters such as vertical writing or central justification, a character unit such as decorative characters alphabetic characters, and the indication whether a basic format is adopted or not.

As described above, since the liquid crystal display 35 includes the character display area 2, the line number indicator 3, and the attribute indicators 4, the display drive circuit 36 also roughly includes a drive unit 36*a* corresponding to the character display area 2, a drive unit 36*b* corresponding to the line number indicator 3, and a drive unit 36*c* corresponding to the attribute indicators 4.

The control unit 20 includes, e.g. a microcomputer. The control unit 20 includes a CPU 21, a ROM 22, a RAM 23, a character generator ROM (CG-ROM) 24, an input interface 25, an output interface 26, and a system bus 27. The CPU 21, the ROM 22, the RAM 23, the character generator ROM (CG-ROM) 24, the input interface 25, and the output interface 26 are connected to one another through the system bus 27.

The ROM 22 includes one or at least two ROM chips. Various processing programs and various pieces of fixed data such as Japanese phonetic characters-Chinese characters conversion dictionary data are stored in the ROM 22. For example, a program for executing a power-on process (hereinafter properly referred to as power-on program) 22*a* and a program of executing a printing process (hereinafter properly referred to as printing program) 22*b* are also stored in the ROM 22.

The RAM 23 includes one or at least two RAM chips, and the RAM 23 is used as a working memory. The RAM 23 also includes the fixed data with respect to user input and the like. Although the RAM 23 is simply shown as a random access memory in FIG. 1, it is assumed that the RAM 23 has a broad concept including other memory devices such as an EEPROM used as the working memory or a saving memory. The RAM 23 has a printing buffer which performs dot expansion of the character string to be printed and holds the dot-expanded character string, a display buffer in which a display image for the input character string is stored, a text buffer in which the character data concerning the printing and input is stored, a line number indicator status retention buffer which holds a display mode for the line number indicator 3, an attribute indicator status retention buffer which retains the display mode for the attribute indicators 4.

Further, in the embodiment, the RAM (EEPROM) 23 has a storage area 23*a* of already printed input data. The already printed input data means the latest predetermined number of pieces of input data (for example, five pieces of data at the maximum) in which the printing has been performed, and the already printed input data is different from the registration file. The storage area 23*a* of the already printed input data is divided into, e.g. five areas so that the five pieces of already printed input data can be stored in the storage area 23*a*. In the five pieces of the already printed input data, the latest data which has been printed is stored in the first divided area, the second latest data which has been printed is stored in the second divided area, and the remaining pieces are stored in a similar manner.

A management table of the already printed input data is provided in addition to the storage area 23*a* of the already printed input data, the already printed input data is stored into the divided area which is empty at that time, and the attributes such as old or new can be managed by the management table.

Dot patterns of the characters and symbols prepared for the tape printing apparatus are stored in CG-ROM 24. When code data specifying the character or the symbol is given, the CG-ROM 24 outputs the corresponding dot pattern. It is also possible that the CG-ROM for display and the CG-ROM for printing are separately provided. It is also possible that a storage format of font information is either an outline font format or a bit map format.

The input interface 25 functions as an interface between the input unit 10 and the control unit 20, and the output interface 26 functions as the interface between the output unit 30 and the control unit 20.

CPU 21 executes the processing program which is stored in the ROM 22 and determined according to an input signal from the input unit 10 or a processing stage at that time, while utilizing the RAM 23 as the working area or using properly the fixed data stored in the ROM 22 or the RAM 23 if necessary. The CPU 21 causes the liquid crystal display 35 to display a processing status or process result or causes the thermal head 32 to print the process result in the tape (not shown).

The action of the tape printing apparatus (tape printing method or small print producing method) of the embodiment will be described below. Referring to a flow chart of FIG. 2, the normal printing action will be described.

Figure 2:
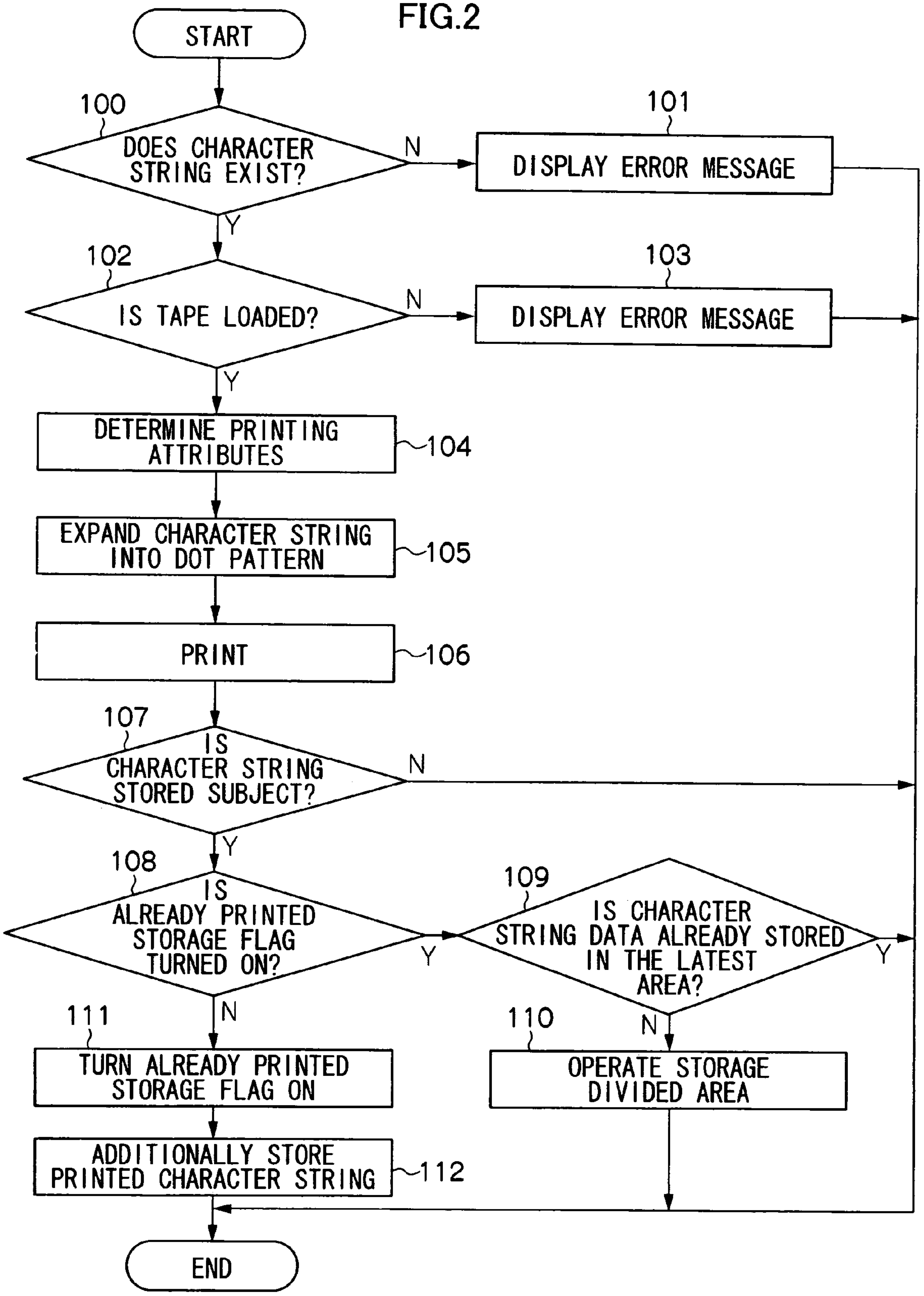
FIG. 2 is a flow chart showing printing operation of the tape printing apparatus of the embodiment.

When the printing key 11*b* is operated, the CPU 21 starts a printing program 22*b* shown in FIG. 2. The CPU 21 decides whether the character string to be printed or the like exists or not (Step 100). When the character string to be printed or the like does not exist, the CPU 21 causes the liquid crystal display 35 to display an error message that the character string does not exist for a predetermined time (Step 101) and ends a series of processes shown in FIG. 2.

When the character string to be printed exists, the CPU 21 decides with the signal from the tape width sensor 12 whether the tape (tape cassette) is loaded or not (Step 102). When the tape is not loaded, the CPU 21 causes the liquid crystal display 35 to display an error message that the tape is not loaded for a predetermined time (Step 103) and ends the series of processes shown in FIG. 2. At this point, it is also possible that the CPU 21 prompts the user to load the tape and waits for the load of the tape.

When the tape is loaded, the CPU 21 determines various printing attributes such as a character size and a pitch between characters or recognizes setting values on the basis of the tape width of the loaded tape (Step 104), and the CPU 21 expands the character string or the like in the printing buffer while following the printing attributes and accessing the CG-ROM 24 (Step 105). The CPU 21 causes the tape or the ink ribbon to run to perform the printing while driving the thermal head 32 according to the information on the expanded character string (dot pattern) (Step 106). In the case of the apparatus including the automatic cutting mechanism, the printing process in Step 106 includes the automatic cutting of the tape.

Then, the CPU 21 decides whether the printed character string is a subject which can be stored in the storage area 23*a* of the already printed input data or not (Step 107). When the printed character string is one which is read from the registered file, address, or name, the CPU 21 decides that the printed character string is not the subject which can be stored in the storage area 23*a* of the already printed input data. In this case, the CPU 21 ends the series of processes shown in FIG. 2. It is also possible that the character string read from the registered file, address, or name is also set to the subject which can be stored in the storage area 23*a* of the already printed input data. When a barcode is printed, it is also possible that the barcode data is set to the subject which can be stored in the storage area 23*a* of the already printed input data.

When the printed character string is the subject which can be stored in the storage area 23*a*, the CPU 21 decides whether an already printed storage flag given to the printed character string is turned on or off (Step 108). The already printed storage flag is turned on when the corresponding character string data is stored in the storage area 23*a* of the already printed input data, and the already printed storage flag is turned off when the corresponding character string data is not stored in the storage area 23*a* of the already printed input data. When the character string is newly input, the already printed storage flag which is turned off is given to the character string.

When the already printed storage flag is turned on, the CPU 21 decides whether the printed character string data is stored in the storage area 23*a* of the already printed input data as the latest data or not (Step 109). When the printed character string data is already stored in the storage area 23*a* as the latest data (first divided area), the CPU 21 ends the series of processes shown in FIG. 2. When the printed character string data is already stored in the storage area 23*a* as the second latest data or thereafter, while the CPU 21 stores the printed character string data and the printing attribute information in the first divided area with respect to the latest data of the storage area 23*a*, the CPU 21 changes the divided areas in which other pieces of already printed input data are stored according to the storage of the printed character string data and the printing attribute information in the first divided area (Step 110). Then, the CPU 21 ends the series of processes shown in FIG. 2.

When the character string is edited after the printing, it is possible to change the already printed storage flag from on to off, or it is possible that the already printed storage flag is left in the on-state. In the latter case, when the printing direction is provided for the character string of post-edit again to enter the process of FIG. 2, the CPU 21 also confirms whether the character string is edited or not in Step 108, the CPU 21 may update the character string when the character string is edited. In Step 110, it is also possible to update the character string.

When the result that the already printed storage flag of the printed character string is turned off is obtained in the decision of Step 108, after the CPU 21 changes the already printed storage flag to on (Step 111), while the CPU 21 stores the printed character string data and the printing attribute information in the first divided area of the storage area 23*a* as the latest data, the CPU 21 changes the divided areas in which other pieces of already printed input data are stored according to the storage of the printed character string data and the printing attribute information in the first divided area (Step 112). Then, the CPU 21 ends the series of processes shown in FIG. 2.

In the process of Step 112, when the maximum number of pieces of already printed input data is stored in the storage area 23*a* before the printed character string data is added to the storage area 23*a*, the oldest already printed input data (data stored in the fifth divided area) is erased from the storage area 23*a* by the process of Step 112.

When the series of processes shown in FIG. 2 is ended, the CPU 21 returns the display of the liquid crystal display 35 or the like to the state immediately prior to the operation of the printing key 11*b*.

Although the processes from Step 107 for operating the storage area 23*a* of the already printed input data are performed after the printing process of Step 106 in FIG. 2, it is also possible to reverse the order of the printing process and the processes for operating the storage area 23*a*. Although the action under the normal printing direction is shown in FIG. 2, the processes similar to the processes shown in FIG. 2 are also performed in the special printing such as continuous printing, such that the printed character string data is written in the storage area 23*a* of already printed input data.

Referring to the flow chart of FIG. 3, the feature operation in turning power on (power key 11*a* is turned on) will be described below.

Figure 3:
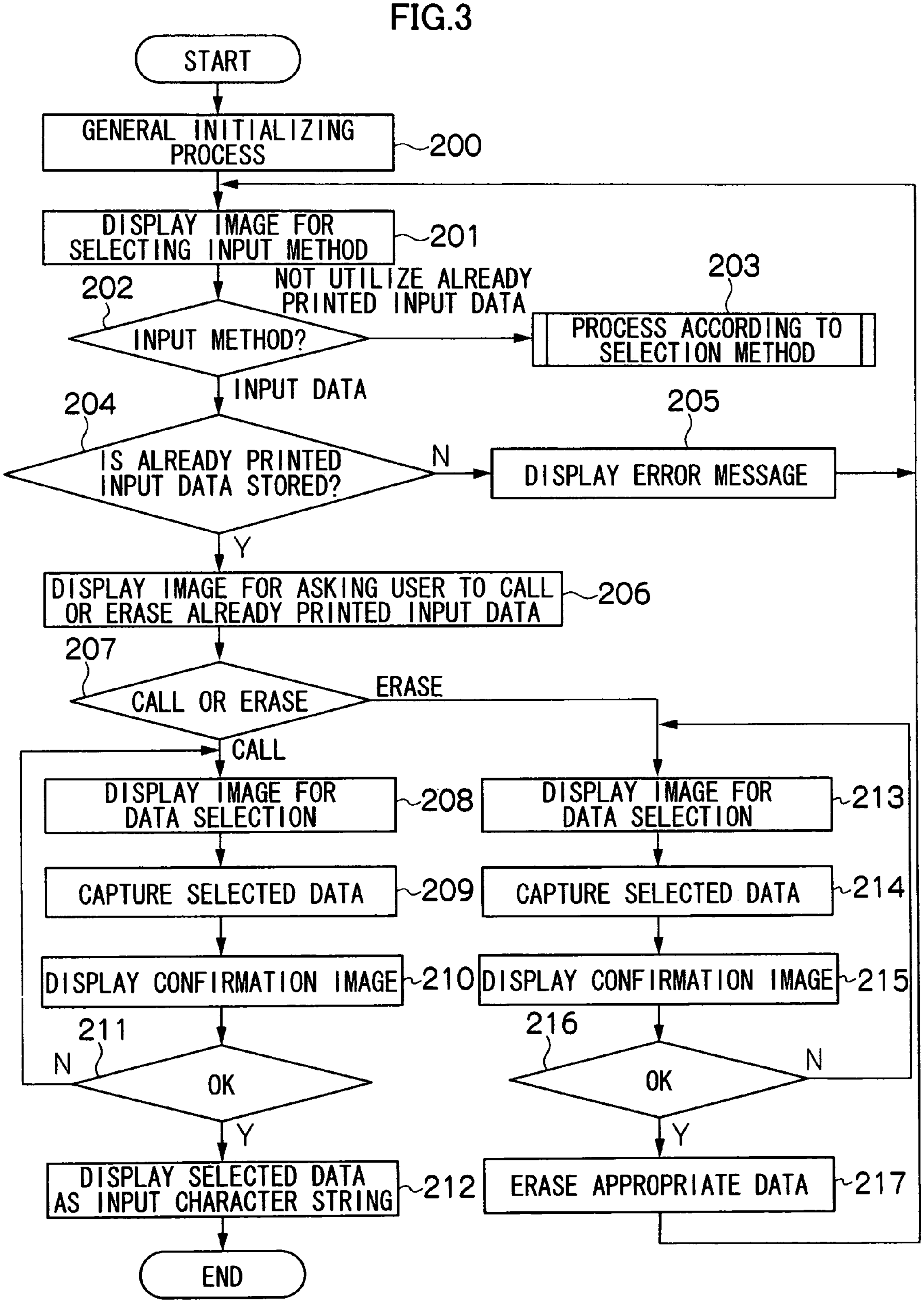

When the power key 11*a* is turned on, the CPU 21 starts a power on program shown in FIG. 3. The CPU 21 performs a general initializing process in turning power on as before (Step 200).

Figure 4:
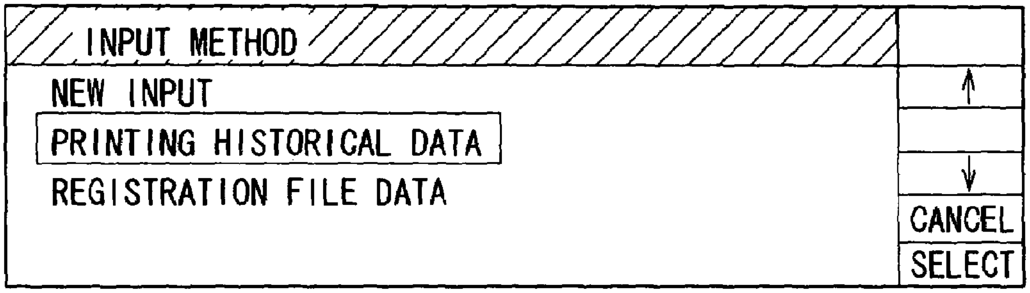

The CPU 21 causes the liquid crystal display 35 to display the image for asking the user to select the input method shown in FIG. 4 including options of "New Input," "Print Historical Data," and "Registration File Data" (Step 201). Then, according to the display of the image for asking the user to select the input method, the CPU 21 decides the option of the input method which is selected by the user with the key input unit 11 (Step 202).

"New Input" is the option indicating that the character string to be printed is newly input, "Print Historical data" is the option indicating that the already printed input data stored in the storage 23*a* as the character string to be printed is utilized, and "Registration File Data" is the option indicating that the file data registered as the character string to be printed is utilized. When the apparatus has registration functions such as the address and the name, it is also possible to include the registration functions in the option.

Although the detail description is neglected, when "New Input" is selected, the CPU 21 causes the liquid crystal display 35 to display a blank input image for the new input. When "Registration File Data" is selected, after the CPU 21 causes the user to select the desired registration file data from the plurality of pieces of registration file data, the CPU 21 causes the liquid crystal display 35 to display the input image including the selected registration file data (Step 203).

Figure 5:
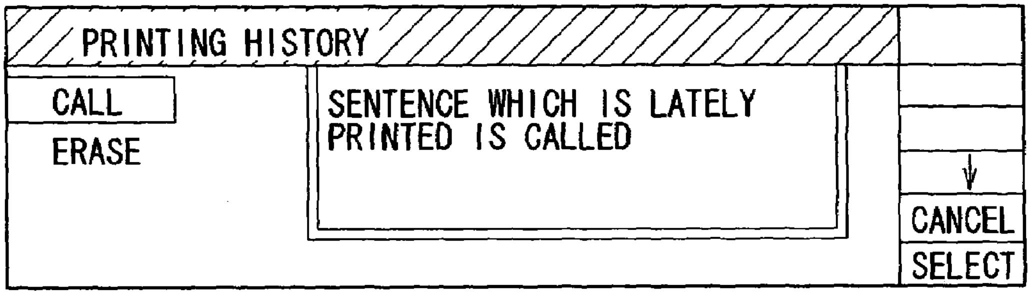
FIG. 5 shows a selection image for calling and erasing already printed input data of the tape printing apparatus of the embodiment.

When "Print Historical Data" is selected, the CPU 21 decides whether at least one piece of already printed input data is stored in the storage area 23*a* or not (Step 204). When at least one piece of already printed input data is not stored in the storage area 23*a*, the CPU 21 causes the liquid crystal display 35 to display the message that the already printed input data is not stored for the predetermined time (Step 205), and the CPU 21 returns to Step 201. When the already printed input data is stored in the storage area 23*a*, the CPU 21 causes the liquid crystal display 35 to display the image for asking the user to perform the edit function shown in FIG. 5 including the options of "Call" and "Erase" (Step 206), and the CPU 21 decides the option of the edit function which is selected and input by the user with the key input unit 11 (Step 207).

Figure 6:
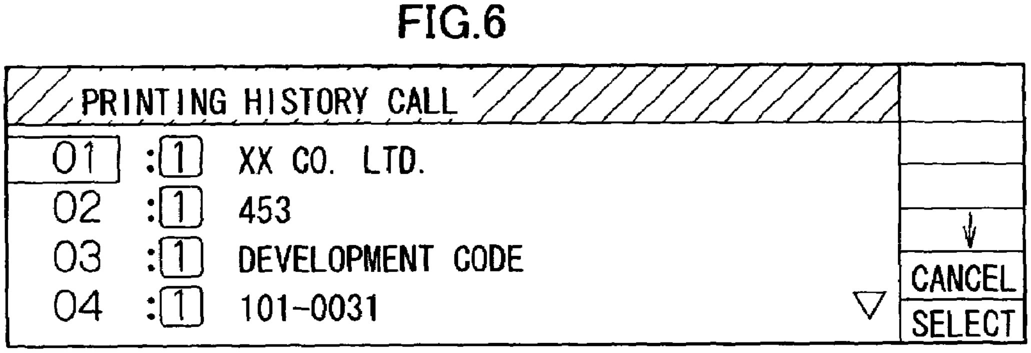
FIG. 6 shows a selection image of the already printed input data which the tape printing apparatus of the embodiment calls.

When "Call" is selected, the CPU 21 fetches the pieces of first line data of each already printed input data stored in storage area 23*a* to set the fetched pieces of first line data to the option, and the CPU 21 causes the liquid crystal display 35 to display the selection image for calling the already printed input data shown in FIG. 6 (Step 208). According to the display of the selection image for calling the already printed input data, the CPU 21 captures the option of the already printed input data which is selected and input by the user with the key input unit 11 (Step 209). In this case, it is possible to make the selection by operating the selection key after the cursor is located on the option, or it is possible to make the selection by operating the execution key after the number is input.

Figure 7:
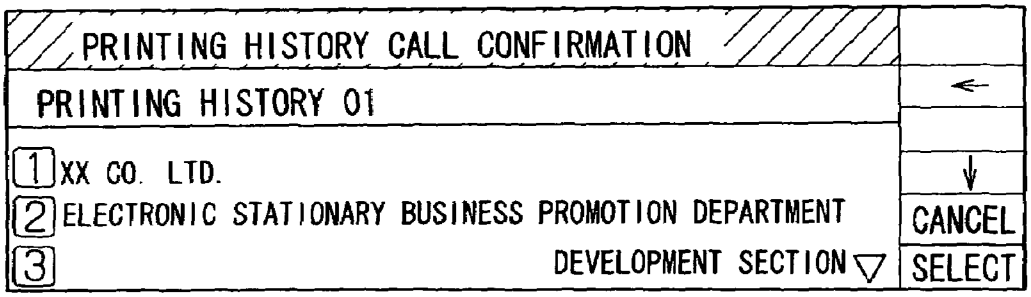
FIG. 7 shows a confirmation image of the already printed input data which the tape printing apparatus of the embodiment calls.

Then, the CPU 21 causes the liquid crystal display 35 to display the call confirmation image shown in FIG. 7 including the full text of the selected already printed input data (Step 210). According to the display of the call confirmation image, the CPU 21 decides whether the user operates "OK" to the input key unit 11 or not (Step 211). Even when the full text is not displayed at once, the full text can be confirmed by scrolling.

When the negative operation is performed to the call confirmation image, the CPU 21 returns to Step 208. When the positive operation is performed to the call confirmation image, the CPU 21 copies the selected already printed input data in the input buffer (at this point, the already printed storage flag is set to on) or expands the selected already printed input data in the display buffer and causes the liquid crystal display 35 to display the input image including the selected already printed input data (Step 212). Then, the CPU 21 ends the series of processes shown in FIG. 3. In a period of time during the expanding action before the CPU 21 causes the liquid crystal display 35 to display the input image including the selected already printed input data, it is possible that the message of "Under execution of selection" is displayed on the liquid crystal display 35.

When "Erase" of the already printed input data is selected in the decision of Step 207, the CPU 21 fetches the pieces of first line data of each already printed input data stored in storage area 23*a* to set the fetched pieces of first line data to the option, and the CPU 21 causes the liquid crystal display 35 to display the selection image (not shown, similar to the call selection image of FIG. 6) for erasing the already printed input data (Step 213). According to the display of the selection image for erasing the already printed input data, the CPU 21 captures the option of the already printed input data which is selected and input by the user with the key input unit 11 (Step 214).

Then, the CPU 21 causes the liquid crystal display 35 to display the erase confirmation image (not shown, similar to the call confirmation image of FIG. 7) including the full text of the selected already printed input data (Step 215). According to the display of the erase confirmation image, the CPU 21 decides whether the user operates "OK" to the input key unit 11 or not (Step 216).

When the negative operation is performed to the erase confirmation image, the CPU 21 returns to Step 213. When the positive operation is performed to the erase confirmation image, while the CPU 21 erases the selected already printed input data from the storage area 23*a*, the CPU 21 changes the other divided areas of the already printed input data (Step 217). Then, the CPU 21 returns to Step 201.

In turning the power on, it is also possible that only the call of the already printed input data is recognized and the erase of the already printed input data is not recognized. In this case, Steps 206, 207, and 213 to 217 are neglected.

Although the already printed input data is called or erased in turning the power on, the already printed input data can be also called or erased in the input state.

In this case, the display image of the data registration function is displayed by operating the appropriate key in the key input unit 11. The display image of the data registration function includes the options of "Printing Historical Data" or "Registration File Data" (or "Registration Address Data" or "Registration Name Data"). When "Printing Historical Data" is selected, the processes from Step 204 are performed. In this case, the input character string which is being input is automatically erased.

According to the embodiment, the printed character string is automatically stored and the printed character string can be utilized again by the call afterward, so that, independently of the file registration function (or an address registration function or a name registration function), the character string which has been input can be utilized and the usability of the user can be improved.

The printing direction is accompanied with the condition that the reusable character string is automatically stored, so that the appropriate character string can be stored. For example, it is considered that the input character string is automatically stored in providing the direction for turning the power off. However, the input character string is often not completed in providing the direction for turning the power off. On the contrary, the character string which has been printed is substantially completed.

According to the embodiment, the image for new input is not immediately displayed in turning the power on, but the user has an opportunity to select the character string which has been already printed. Therefore, when the user turns the power on again after temporarily turning the power off due to, e.g. a break such as lunchtime, the user can select the character string which has been printed from the beginning, so that the usability is also improved in this point. That is, the usability is improved by calling the character string which has been printed after the image for new input is temporarily displayed. When the character string which has been printed is called, many users previously determine to call the character string which has been printed before turning the power on.

In this connection, the conventional tape printing apparatus has the special characteristics that the tape printing apparatus is used for the production of the various labels, the tape printing apparatus has the extremely small number of input characters when compared with a word processor, and, in most cases, the printing is performed to produce the label when the input action is performed. Therefore, there are few ideas that the character string which has been printed is important, and the image for new input is displayed in turning the power on.

When the automatic storage function of the character string which has been printed of the embodiment is utilized, pseudo-file registration can be realized even if the number of registration filed reaches the upper limit number.

(B) Other Embodiments

Although various modifications of the invention are referred to in the description of the embodiment, the following modifications can be further cited.

Although the maximum storage number of pieces of already printed input data is fixed in the above-described embodiment (for example, five pieces), it is also possible that the user sets the maximum storage number. For example, "Maximum Storage Number Setting" is provided as the option in the selection image of FIG. 4, the maximum storage number is input and captured in selecting the option, and it is possible that the old already printed input data is erased when the newly set maximum storage number is smaller than the maximum storage number already set. It is also possible that the apparatus automatically changes the maximum storage number. For example, it is possible that the total number of "Registration File Number" (the registration address number or the registration name number can be also used) and "Already Printed Input Data Storage Number" is set to 100 and the remaining number of the registration file number at that time is set to the maximum storage number of the already printed input data. Even in this case, it is preferable that the file registration is arbitrarily recognized and the minimum storage number of the already printed input data is defined. When the external recording medium is installed, it is possible that the maximum storage number is increased.

Although the already printed input data is stored in the area distinguished from the registration file in the embodiment, it is also possible that the already printed input data is automatically registered as the file. For example, in the case where file areas having identification numbers of 00 to 99 are provided, it is possible that the areas of 00 to 04 are automatically registered as the file for the already printed input data area (in this case, the file name is automatically given like "Print History 1"). In this case, the calling action can be performed at once in the normal registration file and the already printed input data. The wording of claims shall include this case.

Although the character string which has been printed is automatically stored as the already printed input data during the printing direction in the embodiment, it is also possible that the process in which the user selects whether the character string which has been printed is stored as the already printed input data or not is provided in the printing action. It is also possible that whether the automatic mode in which the character string which has been printed is automatically stored as the already printed input data is utilized or not (or whether storage inquiry is performed or not) is also set to the user's selection item.

Although the apparatus fixedly defines the type of input character string which can be stored as the already printed input data in the embodiment, it is also possible that the user sets the type of input character string. For example, it is possible that the option of "Storage Document Type Setting" is provided as the option in the selection image of FIG. 4, the options such as "General document," "Barcode," "Continuous Printing Document," and "Form Input Document" are provided in selecting the option of "Storage Document Type Setting" (the plurality of options can be selected), and the user selects the type of the input character string which can be stored as the already printed input data. The word of "character string" expressing the storage subject in the claim means the whole of the input information on the printing subject including the barcode and the like.

Although the "Call" and "Erase" are performed to the already printed input data in the embodiment, it is also possible to recognize other actions. For example, it is possible to recognize simple "Reference Display" for confirming contents, "Correction Storage" in which the already printed input data is stored again after the partial correction, "One-operation Erase" in which all the pieces of already printed input data are erased at once, and the like. It is also possible to provide "File Registration" in which the already printed input data is copied in the file area (file registration). In this case, it is also possible to recognize the selection of the already printed input data as a copy source in the copy function in the file registration function.

Although the already printed input data including the attribute information is stored in the embodiment, it is also possible to store the already printed input data with the information which becomes the reference of call decision such as a printing date. Further, it is possible that the attribute information includes the information concerning the special printing, such as the presence or absence of the automatic cutting process of the tape and the presence or absence of the so-called half cut process in which only the print tape is cut and the release paper side is not cut, to perform the storage.

Although the description is not performed in the embodiment, it is possible that the maximum amount of data in which the already printed input data can be stored as one piece of data is determined and the storage is denied when the already printed input data exceeds the maximum amount of data, or it is possible to automatically display the message for asking the user whether the file registration is performed or not to perform the transfer to the file registration mode (when the maximum amount of data permitted in the file is large).

Although the already printed input data is called by operating the predetermined key in the input state in the embodiment, it is possible that the printing is not performed after the liquid crystal display 35 displays (calls) the printing input data, but the printing is directly performed. In this case, after the already printed input data is printed, it is possible to return the display of the input data which is being edited before the already printed input data is called.

Although the tape printing apparatus which is of the dedicated machine is shown in the embodiment, it is also possible that the technical idea of the invention is applied to the tape printing system in which the personal computer and the label printer are integrated, or it is possible that the technical idea of the invention is applied to the stamp (seal) producing apparatus which is of the dedicated machine or the stamp producing system in which the personal computer and the peripheral device for producing the stamp are integrated. That is, the small prints in the invention corresponds to the label, the stamp, and the like. It is assumed that the "production" of stamp surface data in a stamp surface and the "transfer" of the surface data to a predetermined sheet during the process for producing the stamp surface data in the stamp surface are also included in the "printing" referred to in the invention.

What is claimed is:

1. A small print producing apparatus for printing, on a print medium, several lines of an input character string, the apparatus comprising:

already produced input data storage means, divided chronologically into newest data through oldest data storage areas for respectively storing pieces of already produced input data including information on the input character string which has been already printed on the print medium up to an upper limit for the number of pieces of input data corresponding to the number of storage areas;

already produced input data storage controlling means for determining whether an additional, newly printed piece of input data including a character string has an already printed storage flag ON or OFF, for, if the flag is OFF, turning the flag ON and storing the newly-printed piece of input data in the newest data storage area and erasing the piece of already produced input data in the oldest data storage area when the number of pieces of already produced input data stored in the already produced input data storage means with the additional piece of input data exceeds the upper limit; and for, if the flag is ON, determining if the newly printed piece of input data is already stored in the newest data storage area, if already stored, leaving undisturbed the pieces of already produced input data as already stored and, if not already stored, storing the newly printed piece of input data in the newest data storage area and moving other pieces of already produced input data among the divided data storage areas, and already produced input data call controlling means for calling one piece of the already produced input data, according to a user's selection from among pieces of the already produced input data stored in the already produced input data storage means, to retrieve the character string included in the one piece of already produced input data as a character string for input.

2. A small print producing apparatus according to claim 1, wherein the already produced input data call controlling means functions responsive to turning on power to the apparatus.

3. A small print producing method for operating a printing apparatus to print, on a print medium, several lines of an input character string, the method comprising:

storing in an already produced input data storage unit, divided chronologically into newest data through oldest data storage areas, pieces of already produced input data including information on the input character string which has been already printed on the print medium up to an upper limit for the number of pieces of already produced input data;

controlling the storing of a piece of additional, newly printed input data as latest printed input data by:

determining whether the newly printed piece of input data including a character string has an already printed storage flag ON or OFF;

if the flag is OFF, turning the flag ON and storing the newly printed piece of input data in the newest data storage area and erasing the oldest stored piece of already produced input data when the number of pieces of already produced input data stored in the already produced input data storage unit with the additional, newly printed input data exceeds the upper limit;

if the flag is ON, determining if the newly printed piece of input data is already stored in the newest data storage area, if already stored, leaving undisturbed the pieces of already produced input data as already stored and, if not already stored, storing the newly printed piece of input data in the newest data storage area and moving other pieces of already produced input data among the divided data storage areas, and calling one piece of the already produced input data, according to user's selection from pieces of the already produced input data stored in the already produced input data storage unit, to retrieve the character string included in the one piece of already produced input data as a character string for input.

4. A small print producing method according to claim 3, wherein the calling is responsive to turning on power to the printing apparatus.

5. The method of claim 3 further comprising editing the retrieved character string; and printing the edited character string on the print medium.

6. A computer-readable medium encoded with a small print producing program for causing a computer to execute a method for producing a print medium in which several lines of an input character string are printed, the method comprising:

storing already produced input data, including information on the input character string which has been already printed on a print medium as pieces of data not exceeding an upper limit for the number of pieces of already produced input data, in an already produced input data storage unit;

controlling the storing input data as the latest printed input data by:

determining whether or not the newly printed piece of input data including a character string has an already printed storage flag ON or OFF;

if the flag is OFF, turning the flag ON and storing the newly printed piece of input data in the newest data storage area and erasing the oldest stored piece of already produced input data when the number of pieces of already produced input data stored in the already produced input data storage unit with the additional, newly printed input data storage exceeds the upper limit; and if the flag is ON, determining if the newly printed piece of input data is already stored in the newest data storage area and, if already stored, leaving undisturbed the pieces of already produced input data as already stored and, if not already stored, storing the newly printed piece of input data in the newest data storage area and moving other pieces of already produced input data among the divided storage areas, and calling one piece of the already produced input data, according to user's selection from pieces of the already produced input data stored in the already produced input data storage unit, to retrieve the character string, included in the one piece of already produced input data as a character string for input.

7. A small print producing program according to claim 6 wherein the method executed by the computer further comprises displaying the retrieved character string for editing.

* * * * *